United States Patent

Takahashi et al.

[11] 4,017,295
[45] Apr. 12, 1977

[54] HERBICIDAL COMPOSITION

[75] Inventors: Ryohei Takahashi; Isao Yokomichi, both of Kusatsu; Kazuyuki Maeda, Hikone; Takahiro Haga, Kusatsu, all of Japan

[73] Assignee: Ishihara Sangyo Kaisha Ltd., Osaka, Japan

[22] Filed: July 21, 1975

[21] Appl. No.: 597,677

[30] Foreign Application Priority Data

July 24, 1974 Japan .................... 49-84249

[52] U.S. Cl. ........................ 71/66; 71/124
[51] Int. Cl.² ........................ A01N 9/20
[58] Field of Search ................ 71/124, 66

[56] References Cited
UNITED STATES PATENTS 3,776,961  12/1973  Theissen ............ 71/124 X
3,798,276  3/1974   Bayer .............. 71/124 X

FOREIGN PATENTS OR APPLICATIONS 1,255,429  11/1971  United Kingdom

Primary Examiner—Lewis Gotts
Assistant Examiner—Catherine L. Mills
Attorney, Agent, or Firm—Oblon, Fisher, Spivak, McClelland & Maier

[57] ABSTRACT

A herbicidal composition which comprises an active ingredient of a diphenylether having the formula

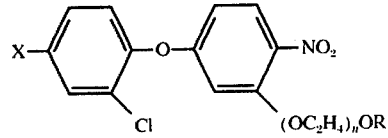

wherein X represents a chlorine atom or a trifluoromethyl group; R represents a methyl or ethyl group and $n$ represents an integer of 2 or 3; and an agriculturally acceptable adjuvant.

3 Claims, No Drawings

HERBICIDAL COMPOSITION

BACKGROUND OF THE INVENTION

1. Field of the Invention

The present invention relates to a herbicidal composition containing an active ingredient of a specific diphenylether type compound and a carrier, which is especially useful for agricultural application.

2. Description of the Prior Art

In spite of the significant decrease in the number of agricultural laborers, agricultural productivity has remained constant or has increased. In great part this is due to new developments in agricultural machines, instruments and chemicals. However, with regard to the latter is not sufficient to obtain new developments and theories of agricultural chemicals to stimulate growth. For example, it is an important problem in the area of herbicides to be able to overcome the formation and growth of resistant weeds. For example, the perennial plant of Arrowhead which had been considered to be a local week, has rapidly grown over large areas as a resistant weed, whereby the growth of agricultural products has been significantly damaged. Accordingly, it is quite an important problem to develop herbicides for controlling the new predominant weeds.

Many known herbicides are diphenylethers including 2,4-dichloro-3'-methoxy-4'-nitrodiphenylether (U.S. Pat. No. 3,776,961); 2-chloro-4-trifluoromethyl-3'-ethoxy-4-nitrodiphenylether (U.S. Pat. No. 3,798,276) and 2,4-dichloro-3'-ethoxyethoxy-4'-nitrodiphenylether (B.P. 1,255,429). However, it is continually necessary to provide new effective diphenylether herbicidal compositions, because the prior art herbicides are not fully satisfactory, especially against certain weeds.

SUMMARY OF THE INVENTION

Accordingly, it is one object of this invention to provide a herbicidal composition which is effective for application to Arrowhead as well as other weeds.

It is another object of this invention to provide a herbicidal composition which is effective for application to various weeds in a paddy field and in a dry field.

These and other objects of this invention as will hereinafter become clear by the ensuing discussion, have been attained by providing a herbicidal composition which comprises an agriculturally acceptable adjuvant and an active ingredient of a diphenylether having the formula

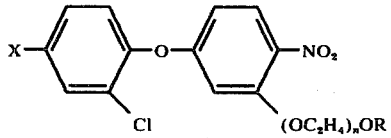

wherein X represent a chlorine atom or a trifluoromethyl group; R represents a methyl or ethyl group and $n$ is 2 or 3.

DETAILED DESCRIPTION OF THE PREFERRED EMBODIMENTS

The inventors have studied diphenylether type herbicides for many years. As a result, the inventors have found that certain specific dephenylether compounds have excellent herbicidal effects on Arrowhead. These effects are superior to those of the known diphenylether compounds. The inventors have found that the specific diphenylether compounds of the invention also impart satisfactory herbicidal effect against Barnyard grass; Toothcup; Long stemmed water-wort; Monochoria; Slender spikerush; Chufa; Bulrush; Large crabgrass; Asiatic dayflower; Chickweed; and the like, and have substantially no phytotoxicity to many plants. Accordingly, the compounds are suitable as herbicides in paddy fields and dry field (up-land) applications.

The active ingredients of the diphenylethers used for the herbicidal compositions of this invention can be produced by the following conventional methods:

1. An alcohol having the formula $RO(C_2H_4O)_nH$ is condensed onto the 2'-position of 2,4-bis(substituted phenoxy) nitrobenzene which is produced by reacting the corresponding phenol with 2,4-dihalo-nitrobenzene.

2. 3-Chloro-4-halobenzotrifluoride is reacted with resorcin, and the resulting m-bis(2-chloro-4-trifluoromethyl phenoxy) benzene is nitrated. An alcohol having the formula $RO(C_2H_4O)_nH$ is condensed onto the 2'-position of the resulting 2,4-bis(2-chloro-4-trifluoromethyl phenoxy) nitrobenzene.

3. An alkyl halide having the formula R-halo adds to the 3'-position of 3'-hydroxyethoxyethoxy-4'-nitrodiphenylether which is produced by the condensation of a phenol and a benzene derivative.

4. An alcohol having the formula $RO(C_2H_4O)_nH$ is condensed to the 3'-position of 3'-chloro-4'-nitrodiphenylether which is produced by the condensation of a phenol and a benzene derivative.

5. A phenol is condensed onto 2-alkoxyethoxyethoxy-4-halonitrobenzene.

6. A 3'-hydroxyethoxyethoxyethoxy-4'-nitrodiphenylether can be used instead of 3'-hydroxyethoxyethoxy-4'-nitrodiphenylether in method (3).

7. A dialkylsulfate can be used instead of the alkylhalide in the methods (3) and (6).

8. A 2-alkoxyethoxyethoxyethoxy-4-halonitrobenzene can be used instead of 2-alkoxyethoxyethoxy-4-halonitrobenzene in method (5).

9. The active ingredient can also be produced by direct nitration.

The reactions involved are shown in the following equations:

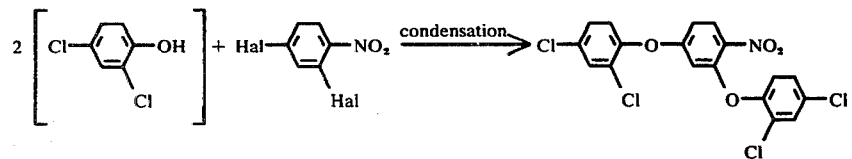

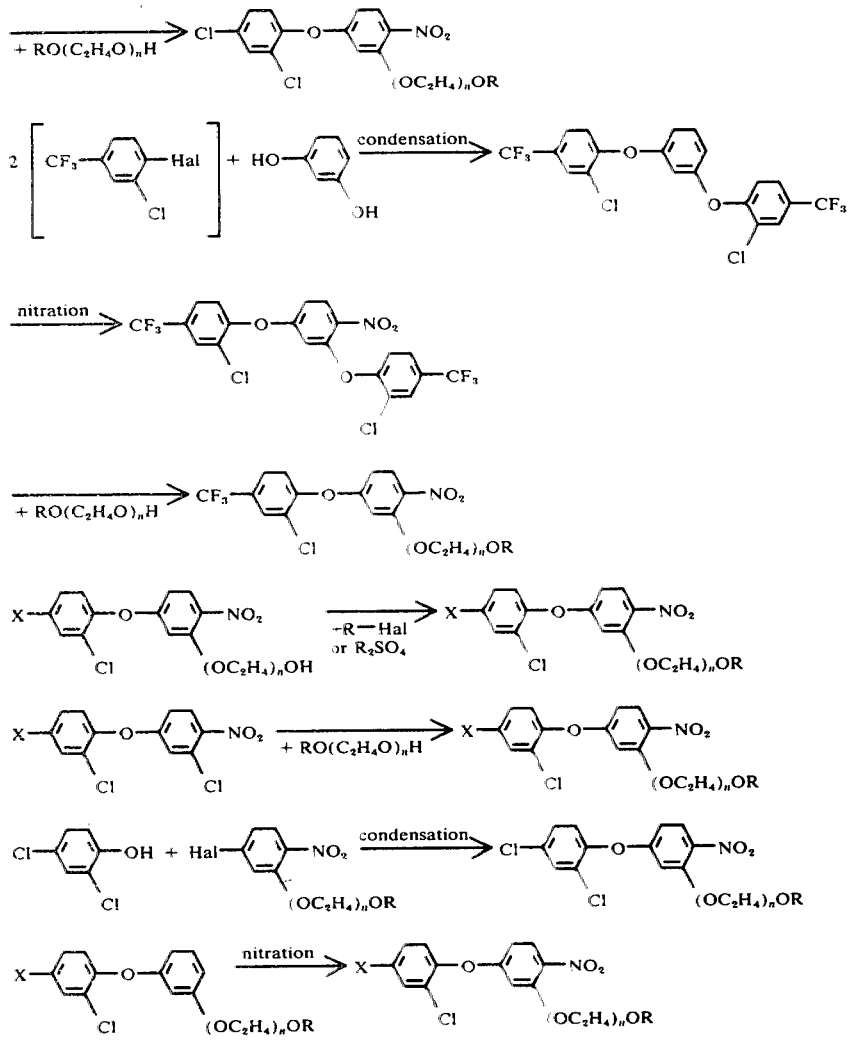

Having generally described the invention, a more complete understanding can be obtained by reference to certain specific examples, which are included for purposes of illustration only and are not intended to be limiting unless otherwise specified.

PRODUCTION EXAMPLE 1

2,4-dichloro-3'-ethoxyethoxyethoxy-4'-nitrodiphenylether

A mixture of 9.0 g of 2,4-bis(2,4-dichlorophenoxy) nitrobenzene and 10 ml of dioxane and 4.0 ml of ethyl carbitol was heated at 80° C. A 1.4 g sample of 95% KOH was gradually added to the mixture with stirring and the reaction was continued at 75° – 80° C for 1 hour with stirring. The reaction product was poured into a desirable amount of water and the oily product was extracted with chloroform. The extract was washed with water, was dried above calcium chloride and then chloroform was stripped off. The residue was distilled under a reduced pressure to obtain 7.5 g of the object compound having a boiling point of 225° – 230° C/1.0 mmHg. The yield was 87%.

PRODUCTION EXAMPLE 2

2-chloro-4-trifluoromethyl-3'-methoxyethoxyethoxy-4'-nitrodiphenylether

A 12.2 g sample of methyl carbitol and 6.4 g of KOH were added to a solution of 35.2 g of 2,3'-dichloro-4-trifluoromethyl-4'-nitrodiphenylether in 50 ml of dioxane at 50° – 60° C. The mixture was reacted at 70° C for 1.5 – 2 hours. The reaction product was poured into a desirable amount of water and the resulting precipitate was extracted with chloroform. The extract was washed with an alkali solution and then with water. It was dried above anhydrous sodium sulfate and then chloroform was stripped off. The residue was distilled under a reduced pressure and was recrystallized with ethanol to obtain 39.2 g of the object compound having a melting point of 43° – 45° C. The yield was 90%.

PRODUCTION EXAMPLE 3

2-chloro-4-trifluoromethyl-3'-methoxyethoxyethoxyethoxy-4'-nitrodiphenylether

A mixture of 10.2 g of 2,4-bis(2-chloro-4-trifluoromethyl phenoxy) nitrobenzene, 10 ml of dioxane and 6 ml of triethylene glycol-monomethyl ether was heated at 70° C. A 1.4 g sample of 95% KOH was gradually added to the mixture with stirring and the reaction was continued at 65° – 70° C for 1 hour with stirring. The reaction product was poured into a desirable amount of water and the oily product was purified by column chromatography to obtain 7.6 g of the object compound. The yield was 78%.

Other suitable active ingredients of the herbicidal composition of this invention, such 2,4-dichloro-3'-methoxyethoxyethoxy-4'-nitrodiphenylether (b.p. 222° – 225° C/1.0 mmHg); 2-chloro-4-trifluoromethyl-3'-ethoxyethoxyethoxy-4'-nitrodiphenylether (m.p. 50° – 53° C); and 2-chloro-4-trifluoromethyl-3'-ethoxyethoxyethoxy-4'-nitrodiphenylether ($n_D^{20}$ 1.575) were produced by a similar method and were used for various tests. These compounds impart excellent herbicidal effects as shown in the following experiments.

The active ingredients can be dispersed in water to produce an aqueous dispersion. The active ingredients can also be formulated into various forms of compositions such as dusts, granules, wettable powders, water miscible solutions, emulsifiable concentrates, and the like, by optionally incorporating agriculturally acceptable adjuvants, such as, solid carriers such as diatomaceous earth, calcium hydroxide, calcium carbonte, talc, white carbon, kaolin, bentonite, or Jeeklite; liquid carriers such as n-hexane, toluene, xylene, solvent naphtha, ethanol, dioxane, acetone, isophorone, methyl isobutyl ketone, dimethyl formamide, dimethyl sulfoxide or water; anionic or nonionic surface active agents such as sodium alkylsulfate, sodium alkylbenzenesulfonate, sodium ligninsulfonate, polyoxyethylene lauryl ether, polyoxyethylene alkylaryl ether, polyoxyethylene fatty acid ester, or polyoxyethylene sorbitan fatty acid ester; and the like.

COMPOSITION EXAMPLE 1

12 wt. parts of 2,4-dichloro-3'-methoxyethoxyethoxy-4'-nitrodiphenylether, 60 wt. parts of solvent naphtha, 23 wt. parts of N-methyl pyrrolidone and 5 wt. parts of polyoxyethylene glycol nonyl phenylether (manufactured by Daiichi Kogyo Seiyaki K.K.) were uniformly admixed to form a water miscible solution.

COMPOSITION EXAMPLE 2

5 wt. parts of 2-chloro-4-trifluoromethyl-3'-ethoxyethoxyethoxy-4'-nitrodiphenylether, 90 wt. parts of bentonite and 5 wt. parts of sodium lignin sulfonate were mixed. Then, a suitable amount of water for granulation was added to the mixture to form granules.

COMPOSITION EXAMPLE 3

20 wt. parts of 2-chloro-4-trifluoromethyl-3'-methoxyethoxyethoxy-4'-nitro diphenylether, 75 wt. parts of Jeeklite, 3 wt. parts of sodium lignin sulfonate, and 2 wt. parts of sodium naphthalenesulfonate-formaldehyde concentrate were uniformly mixed and pulverized to form a wettable powder.

COMPOSITION EXAMPLE 4

20 wt. parts of 2-chloro-4-trifluoromethyl-3'-methoxyethoxyethoxyethoxy-4'-nitrodiphenylether, 60 wt. parts of xylene, 15 wt. parts of polyoxyethylene alkylarylether, and 5 wt. parts of alkylaryl sulfonate were mixed uniformly to form an emulsifiable concentrate.

The herbicidal compositions of this invention can be applied in various places such as paddy fields, up-lands (dry fields), orchards, mulberry farms, forests, ridges, building ground, factory sites, and the like. They may be applied by direct application to the soil or to the foliage (stems and leaves). The quantity of the herbicidal compositions of this invention to be used varies over a wide range depending upon the conditions of the weather, the soil, the form of the composition, the season, the method of application, the type of the weeds treated and similar conventional considerations. Usually, the amount of the active ingredient is applied in the range of from 0.5 – 100 glare (100 m$^2$), preferably 1 – 50 g/are, and most preferably 2.5 — 30 g/are. The active ingredients of the herbicidal compositions of this invention may be used alone or together with herbicidal compounds, insecticides, fungicides, fertilizers, soils or the like. Synergistic effects may be found in certain combinations. The herbicidal compositions of this invention impart excellent herbicidal effects not only against Arrowhead, which is an especially noxious weed in plant husbandry, but also to other weeds, as described above.

EXPERIMENT 1

Pots of 1/10,000 are (100 m$^2$) were filled with soil and the soil was supersaturated with water. Arrowhead was grown as the predominant weed. When Arrowhead appeared on the surface of the soil, water was poured into each pot to a depth of 3 cm. Then, an aqueous dispersion of one of the active ingredients shown in Table 1 was poured into the pot (active ingredient: 5 g/are). Fourteen days after the treatment, the growth of Arrowhead was evaluated. The results are shown in Table 1. The degree of growth control is denoted by the following standards:

5: complete growth suppression.
4: very high growth suppression.
3: about 60% growth suppression as compared with untreated plants.
2: about 30% growth suppression as compared with untreated plants.
1: no apparent difference between treated plants and untreated plants.

TABLE 1

| Symbol | Active Ingredient | Degree of growth control |
|---|---|---|
| A | 2,4-dichloro-3'-methoxy-ethoxyethoxy-4'-nitrodiphenylether | 5 |
| B | 2,4-dichloro-3'-ethoxy-ethoxyethoxy-4'-nitrodiphenylether | 4 |
| C | 2-chloro-4-trifluoromethyl-3'-methoxy-ethoxyethoxy-4'-nitrodiphenylether | 5 |
| D | 2-chloro-4-trifluoromethyl-3'-ethoxy-ethoxyethoxy-4'-nitrodiphenylether | 5 |
| E | 2-chloro-4-trifluoromethyl-3'-ethoxy-ethoxyethoxyethoxy-4'-nitro diphenylether | 5 |
| Ref. 1 | 2-chloro-4-trifluoromethyl-3'-ethoxy-4'-nitro diphenylether | 1 |

TABLE 1-continued

| Symbol | Active Ingredient | Degree of growth control |
|---|---|---|
| Ref. 2 | 2-chloro-4-trifluoromethyl-3'-methoxy-ethoxy-4'-nitro-diphenylether | 1 |
| Ref. 3 | 2,4-dichloro-3'-ethoxyethoxy-4'-nitro diphenylether | 1 |

EXPERIMENT 2

Pots of 1/10,000 are (100 m²) were filled with soil and the soil was supersaturated with water. A specific amount of air-dried edible barnyard grass seed was sown in the pot and covered with soil. When the growing barnyard grass appeared on the surface, water was poured into each pot to a depth of 3 cm. Then, an aqueous dispersion of one of the active ingredients of this invention, as shown in Table 2, was poured into the pot. Fourteen days after this treatment, the grass which had survived was collected, air-dried and weighed. The results are shown in Table 2 in percent by weight of the grass which survived in the treated pot versus the amount of grass from the untreated pot, and are indicated as "Degree of Growth".

TABLE 2

| Active Ingredient | Degree of Growth (%) Amount of active Ingredient (g/are) | |
|---|---|---|
| | 5 | 2.5 |
| A | 0 | 4 |
| B | 0 | 0 |
| C | 0 | 0 |
| D | 0 | 0 |
| E | 0 | 0 |

EXPERIMENT 3

Pots 1/10,000 are were filled with soil and the soil was super-saturated with water. Soil containing seeds of Toothcup, Long stemmed water-wort, Monochoria, Slender spikerush, Chufa and Bulrush were placed in each pot to a depth of 5 mm. Water was poured into each pot to a depth of 3 cm. Seven days after this treatment, an aqueous dispersion of one of the active ingredients of this invention, as shown in Table 3, was sprayed on the soil (active ingredient 10 g/are). Fourteen days after this treatment, the growth of the weeds was evaluated. The results are shown in Table 3. In the Table, the degree of growth control is the same as in Experiment 1.

TABLE 3

| Active Ingredient | Degree of Growth Control | | | | | |
|---|---|---|---|---|---|---|
| | Tooth-cup | Long stemmed water-wort | Mono-choria | Slender spikerush | Chufa | Bulrush |
| A | 5 | 5 | 5 | 5 | 5 | 4 |
| B | 5 | 5 | 5 | 4 | 5 | 5 |
| C | 5 | 5 | 5 | 5 | 5 | 5 |
| D | 5 | 5 | 5 | 5 | 5 | 4 – 5 |
| E | 5 | 5 | 4 | 4 | 5 | 5 |

EXPERIMENT 4

Pots of 1/10,000 are were filled with soil to provide an up-land condition. A specific amount of an air-dried edible barnyard grass seed was sown in the pot and covered with soil to a depth of 1 cm. When the growing barnyard grass reached the two leaf stage, an aqueous dispersion of one of the active ingredients of this invention (concentration of 2000 ppm) was sprayed as a foliage treatment (stems and leaves). Fourteen days after this treatment, the growth of the barnyard grass was observed. The results are shown in Table 4. The degree of Growth Control was evaluated by ten rating grades, in which 10 indicates complete inhibition of growth and 1 indicates no inhibition.

TABLE 4

| Active Ingredient | Degree of Growth Control |
|---|---|
| A | 10 |
| B | 10 |
| C | 10 |
| D | 10 |

EXPERIMENT 5

Lots of 1 m² were set in an upland farm. An aqueous solution of 20% wettable powder formulated by the same manner of Composition Example 3 or a 20% emulsifiable concentrate formulated by the same manner of Composition Example 4 was sprayed onto the lot prior to the emergence of weeds. Sixty days after this treatment, the growth of weeds was evaluated. The results are shown in Table 5. The evaluation grades in Table 5 are on the same scale as in Experiment 4.

TABLE 5

| Active Ingredient | Amount of Active Ingredient (glare) | Degree of Growth Control | | | |
|---|---|---|---|---|---|
| | | Asiatic dayflower | Chick-weed | Large crab-grass | Barn-yard grass |
| C(20% wettable powder) | 20 | 10 | 10 | 10 | 10 |
| | 10 | 10 | 10 | 10 | 10 |
| D(20% wettable powder) | 20 | 10 | 10 | 10 | 10 |
| | 10 | 10 | 10 | 10 | 10 |

TABLE 5-continued

| Active Ingredient | Amount of Active Ingredient (glare) | Degree of Growth Control | | | |
| --- | --- | --- | --- | --- | --- |
| | | Asiatic dayflower | Chickweed | Large crabgrass | Barnyard grass |
| E(20% emulsifiable concentrate) | 20 | 10 | 10 | 10 | 10 |
| | 10 | 9 | 10 | 10 | 10 |

Having now fully described the invention, it will be apparent to one of ordinary skill in the art that many changes and modifications can be made thereto without departing from the spirit or scope of the invention as set forth herein.

What is claimed as new and intended to be covered by Letters Patent is:

1. A method of controlling aquatic and hygrophytic weed-growth which comprises applying to paddy fields or dry fields a herbicidally effective amount of a herbicidal composition which comprises an active ingredient of a diphenylether having the formula

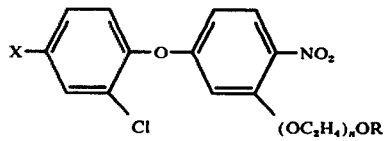

wherein X represents a chlorine atom or a trifluoromethyl group; R represents a methyl or ethyl group and $n$ represents an integer of 2 or 3; and an agriculturally acceptable adjuvant.

2. The method of claim 1, wherein the weed is Arrowhead.

3. The method of claim 1 wherein the amount of the herbicide is 0.5 – 100 g/are.